(12) United States Patent
Dickinson et al.

(10) Patent No.: US 9,350,024 B2
(45) Date of Patent: May 24, 2016

(54) LEAD-CARBON BATTERY CURRENT COLLECTOR SHIELDING WITH PORTED PACKETS

(71) Applicant: Axion Power International, Inc., New Castle, PA (US)

(72) Inventors: Enders Dickinson, New Castle, PA (US); Jack A. Shindle, Canfield, OH (US)

(73) Assignee: Axion Power International, Inc., New Castle, PA (US)

( * ) Notice: Subject to any disclaimer, the term of this patent is extended or adjusted under 35 U.S.C. 154(b) by 225 days.

(21) Appl. No.: 14/267,151

(22) Filed: May 1, 2014

(65) Prior Publication Data

US 2014/0329142 A1 Nov. 6, 2014

Related U.S. Application Data

(60) Provisional application No. 61/818,727, filed on May 2, 2013.

(51) Int. Cl.
| | |
|---|---|
| *H01M 4/70* | (2006.01) |
| *H01M 4/04* | (2006.01) |
| *H01M 4/68* | (2006.01) |
| *H01M 4/82* | (2006.01) |
| *H01M 10/06* | (2006.01) |
| *H01M 4/02* | (2006.01) |

(52) U.S. Cl.
CPC ........ *H01M 4/70* (2013.01); *H01M 4/04* (2013.01); *H01M 4/68* (2013.01); *H01M 4/82* (2013.01); *H01M 10/06* (2013.01); *H01M 2004/021* (2013.01); *H01M 2004/027* (2013.01); *Y02E 60/126* (2013.01); *Y10T 29/49108* (2015.01)

(58) Field of Classification Search
CPC ........... H01M 1/70; H01M 4/04; H01M 4/68; H01M 4/82; H01M 10/06
See application file for complete search history.

(56) References Cited

U.S. PATENT DOCUMENTS

| | | | |
|---|---|---|---|
| 6,466,429 | B1 | 10/2002 | Volfkovich et al. |
| 7,110,242 | B2 | 9/2006 | Adrianov et al. |
| 7,749,631 | B2 | 7/2010 | Abd Elhamid et al. |
| 7,881,042 | B2 | 2/2011 | Buiel et al. |
| 7,998,616 | B2 | 8/2011 | Buiel et al. |
| 8,023,251 | B2 | 9/2011 | Buiel et al. |
| 8,202,653 | B2 | 6/2012 | Buiel et al. |
| 8,347,468 | B2 | 1/2013 | Buiel |

FOREIGN PATENT DOCUMENTS

EP 2001073 B1 2/2012

OTHER PUBLICATIONS

Axion Power International, Inc., "Product Description: Residential/ Smal Community 10 kW/12kWh Energy Storage System", Apr. 3, 2012.

*Primary Examiner* — Helen O Conley
(74) *Attorney, Agent, or Firm* — Cahn & Samuels, LLP

(57) ABSTRACT

Provided is an activated carbon lead energy storage/battery containing an improved negative activated electrode packet exhibiting substantially reduced resistance with ported paraffin impregnated expanded graphite foil shielding overlying a cutaway notch in the underlying current collector to permit sulfuric acid electrolyte infiltration.

14 Claims, 4 Drawing Sheets

US 9,350,024 B2

LEAD-CARBON BATTERY CURRENT COLLECTOR SHIELDING WITH PORTED PACKETS

PRIORITY CLAIM

This application claims the benefit of U.S. Provisional Application Ser. No. 61/818,727 filed on May 2, 2013 which is incorporated herein by reference.

FIELD OF INVENTION

This invention relates to a modification improving a lead-carbon battery current collector for an activated carbon electrode. More particularly, the improvement includes the combination of a copper plate current collector with at least one notch formed in the edge opposite of that of the collector's projecting tab and a pair of ports, one each respectively, formed in the sandwiching expanded graphite shields which are located to substantially overlie the centroid of the underlying notch. The counterintuitive modification contemplated by the invention herein, while simple, facilitates and improves the electrode/battery resistance and increases battery power performance and is particularly suited for use in connection with existing activated carbon lead negative electrode (and thus battery/energy storage device) design.

BACKGROUND

Over the past few years, improvements to conventional lead acid batteries/energy storage devices, have evolved. One such improvement involves the substitution for a traditional lead negative electrode by an activated carbon electrode such as that, for example, described in Applicant's U.S. Pat. No. 7,998,616. The electrode is an assembly is composed of a copper current collector, laminated on both surfaces with a paraffin impregnated expanded graphite shield and an outer activated carbon sheet. The upper edge of the electrode current collector features a projecting tab for current collection. This construction is referred herein to as a "standard packet".

Manufacture of low resistance standard packets with a leak-free expanded graphite foil negative electrode structure has proven challenging. Initial efforts to reduce leaks focused on the elimination of pin-holes that developed in the paraffin impregnated expanded graphite foil. The pin-holes were attributed to contamination from, ash particles, in the graphite raw material which reacted with the sulfuric acid electrolyte. The voids/small pin-holes were created from the dissolving of the ash particles in the graphite foil shield material in the presence of sulfuric acid. Batteries made from expanded graphite foil containing ash particles had an average AC impedance of 9.37±1.75 m$\Omega$. The successful elimination of the contamination (ash particles) from the expanded graphite foil raw material solved the perceived pin-hole problem but lead to significantly higher contact resistance. Batteries made with ash free expanded graphite foil had an average AC impedance of 19.21±6.71 m$\Omega$, an impedance increase of 2×.

In a standard packet laminated lead/activated carbon negative electrode, five components contribute to resistance due to its layered structure (from top to middle). The contributors to the cumulative resistance are: a) bulk resistance of the activated carbon sheet; b) interface resistance between the carbon and the impregnated graphite sheet; c) bulk resistance of the impregnated expanded graphite foil; d) interface resistance between the impregnated expanded graphite foil and the copper current collector; and e) bulk resistance of the copper current collector. The bulk resistance of the activated carbon sheet, impregnated graphite sheet and copper current collector are controlled by the materials electrical properties. The interface/contact resistance between the copper current collector and the impregnated expanded graphite foil shield elements has been identified as the potential source of variation in the laminate stack up.

Efforts to lower the standard packet resistance led to measuring the contributions of the bulk resistances of the individual components and assemblies. Measurements were taken the thickness plane using a current of 10 amps and measuring the voltage drop across the electrodes. The bulk resistance of the copper current collector is extremely small when compared to the other components in the laminate and, therefore, its contribution was disregarded. The resistance of the impregnated expanded graphite foil shield was determined to be 0.285+/−0.09 m$\Omega$ and the resistance of the activated carbon sheet was found to be 4.47+/−0.16 m$\Omega$. Overall, the standard packet structure consisting of stacked activated carbon, impregnated expanded graphite foil and copper sheet without an edge laminating adhesive, a construct having no air trapped between the copper sheet and the impregnated graphite shield, should have exhibited resistance of 9.59+/−0.17 m$\Omega$. But the resistance of a standard packet was found to be significantly higher—43.07+/−16.07 m$\Omega$.

While it was believed that that by successfully eliminating the pin-hole formation, would prove beneficial, surprisingly, it was observed that air entrapment inside the standard packet during lamination significantly increased. The increased entrapped air within the then-sealed laminated standard packet resulted in significantly higher contact resistance, and particularly that between the copper current collector and the paraffin impregnated expanded graphite foil layers.

Efforts were then dedicated to minimize the quantity of entrapped air accumulated during lamination but met without success. The entrapment of air was minimized and the resistance of the laminate was reduced to 10.44+/−0.68 m$\Omega$. However, the entrapped air could not be eliminated. Furthermore, in addition to the undesirable increased packet resistance, the variable amount of entrapped air also caused manufacturing difficulties in respect to the force required to compress the cell to the size of the case opening. Because entrapped air acts like a spring during compression, if the entrapped air volume is too large it causes glue line failure during compression leading to the escape of air from and electrolyte penetration into the packet. The resulting batteries made from these packets exhibited a wide resistance variation and concomitantly non-uniform performance.

Therefore, a need exists for a solution for elimination of entrapped air in the activated carbon negative electrode and mitigation of the increased resistance problem.

SUMMARY OF THE INVENTION

It is an object of the present invention to overcome and solve the problem of entrapped air formation in an activated carbon negative electrode packet.

Another object of the invention is to provide an efficient technique for reducing the interface/contact resistance between the copper current collector and the impregnated expanded graphite foil shield.

It is another object of the invention to provide an activated lead carbon based negative electrode structure that promotes battery performance uniformity.

Certain of these and other objects are satisfied by an activated carbon lead negative electrode comprising: a) a generally planar metal current collector with a first and a second surfaces a top edge and a bottom edge, a collector tab projecting from the top edge of the current collector and at least one notch of select dimensions formed along the bottom edge of said current collector; b) first and second layers of expanded graphite foil of select thickness respectively laminated over said first and second surfaces each of said layers incorporating a small port positionally corresponding to and overlying the at least one notch where said port extends through the graphite foil thickness; and c) first and second activated carbon sheeting laminated over said first and second layers.

Other objects are satisfied by an improved battery/energy storage device, with a positive electrode, a negative electrode and sulfuric acid electrolyte where the negative electrode is a laminated activated carbon comprising: a) a generally planar copper metal current collector with a first and a second surfaces a top edge and a bottom edge, a collector tab projecting from the top edge of the current collector and a generally triangular notch disposed along the bottom edge of said current collector; b) first and second layers of paraffin impregnated expanded graphite foil shielding of select thickness respectively laminated over said first and second surfaces where each of said layers incorporates a small port positionally corresponding to and overlying the notch where said port extends through the graphite foil thickness to permit electrolyte infiltration; and c) first and second activated carbon sheeting laminated over said first and second layers.

Still other objects are satisfied by a method of reducing the resistance of a laminated activated carbon lead negative electrode in an energy storage device with sulfuric acid electrolyte where the negative electrode has a first outer layer of activated carbon, a graphite foil shield, a copper current collector with a collector tab projecting from an edge thereof, a second graphite foil shield, and a second outer layer of activated carbon, comprising the steps of: a) removing a portion of the copper current collector along an edge opposite from the collector tab to form a notch therein; and b) forming a port hole in the first graphite foil shield to overlie said notch and allow infiltration of the sulfuric acid electrolyte.

In simplest terms, this invention employs the counterintuitive notion of providing at least one port through the graphite shield overlying a notch or cutout, in the current collector plate. Surprisingly, it was found that when a standard packet was ported, the resistance was reduced to 9.82+/−0.66 mΩ.

This invention specifically provides an improvement over other prior technologies. The introduction of at least one small diameter circular hole/port formed near but not at the bottom of the graphite foil shielding material of electrode assembly to reduce edge effect corrosion, to overlie a preferably triangular shaped notch in the copper metal current collector provides an escape path for any air entrapped in the laminate structure The port hole also allows for penetration of a small amount of electrolyte (commonly sulfuric acid) into the space between the copper current collector and the graphite shield of the sealed packet. Sulfuric acid is a well-known strong electrolyte and electrical conductor so that its presence at the interface reduces contact resistance between the graphite shield and copper plate. By incorporating at least one "port" in each shield, surprisingly the overall resistance over time was lowered by over 70%.

This resistance reduction is attributed to a) improve contact resistance via the removal of air from the originally sealed packet; b) removal of resistive copper oxidation from the collector sheet; and c) improved conductivity between the sheet and the collector. The invention also provides the mechanical benefit of significantly reducing the cell compression variability attributable to trapped air.

As used herein "port" refers to a purpose-designed entry path for electrolyte to enter a packet and allow for the escape of entrapped air. It may be of any select geometry but preferably is circular.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawing, and which is shown by way of illustration to a specific embodiment in which the invention may be practiced. The following illustrated embodiment is described in sufficient detail to enable those skilled in the art to practice the invention. It is to be understood that other embodiments may be utilized and that changes structural or methodological, based on presently known structural and/or functional equivalents may be made without departing from the scope of the invention.

DETAILED DESCRIPTION

Figure 1:
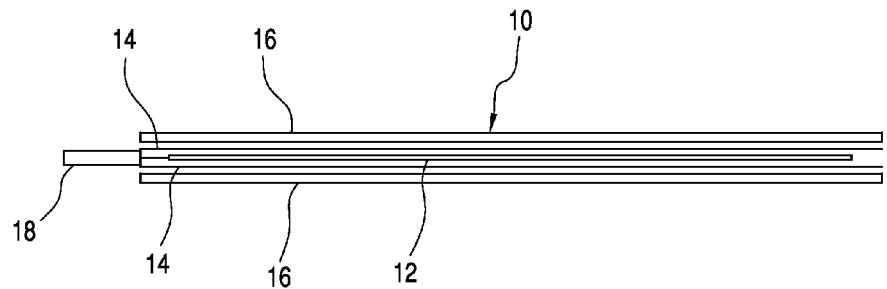
FIG. 1 is an expanded side view of ported packet lead-activated carbon negative electrode assembly according to an embodiment of the invention.
Figure 2:
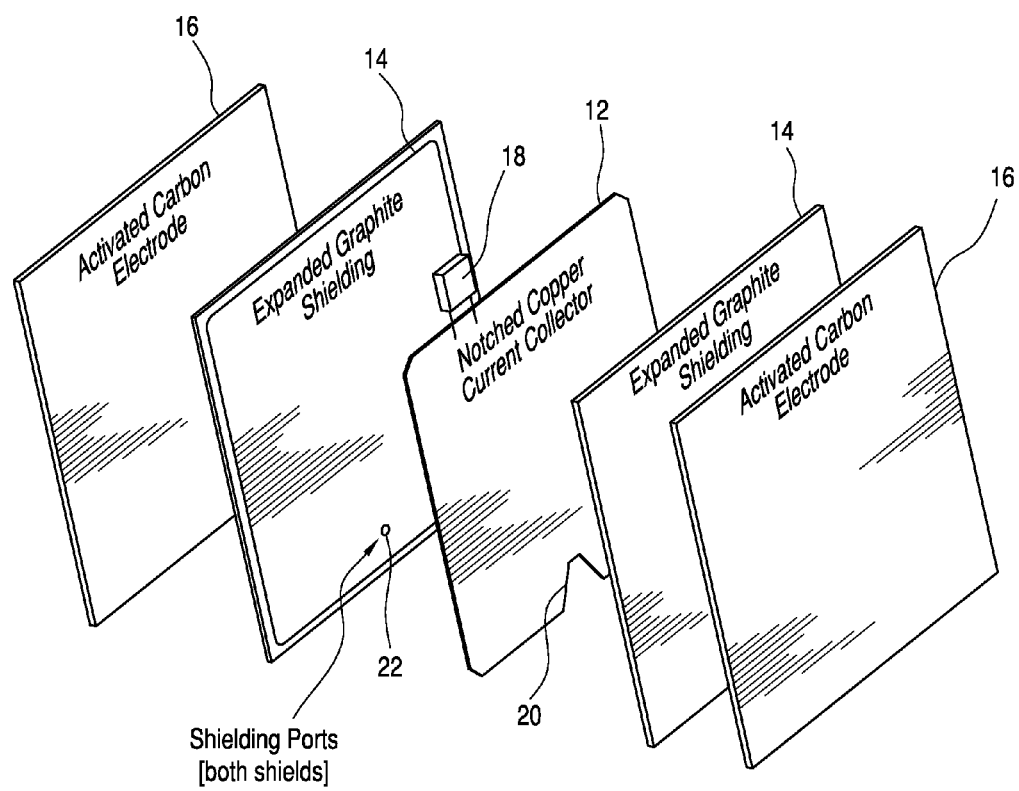
FIG. 2 is an exploded schematic representation view of ported packet lead-activated carbon negative electrode assembly of FIG. 1.

FIGS. 1 and 2 depict a carbon negative electrode 10 constructed according to the ported packet version of the invention. A central copper metal current collector 12 is encased in two layers of expanded graphite shielding 14 which are each covered by activated carbon sheet 16. A collector tab 18 projects from the top edge of the current collector 12 and the bottom edge of collector 12 features a notch 20 preferably of a generally triangular geometry although not limited to such, is disposed at a location to achieve maximal separation from the tab 18. The notch 20 is covered on both sides by the expanded graphite shield (gasket) 14, which preferably is paraffin impregnated and preferably exhibits high conductivity, corrosion resistance, and stability from 0.7 V (SHE) to 1.0 V (SHE).

Each side of the graphite sheet shield 14 includes a small diameter circular hole/port 22 extending through its thickness. Given the potential for copper oxidation of the copper current collector 12 to be focused directly at the location of the port hole 22, the underlying copper has been removed resulting in the formation of the notch 20 and the port 22 is located geometrically at or near the center of the triangular notch 20 (the centroid). Furthermore, it is preferred that the port hole 22 is spaced away from the bottom edge of the graphite shield to minimize edge effect corrosion on the electrode components.

Preferably, the hole diameter should be of a size to avoid clogging by deposits resulting from battery electrochemistry but not so large as to adversely impact shielding and therefore battery efficiency. For this reason port size dimensions range from 0.1 mm to 5 mm and, preferably, about 3 mm to allow the electrolyte to penetrate the collector shielding. While clearly counterintuitive to conventional battery construction teaching, in the case of an activated carbon lead battery construction, when done in a controlled manner, actually improves the lead-carbon battery resistances by over 70% over time.

While not intending to be bound to any particular theory, it is believed that the advantages of allowing controlled acid penetration into the packet are three-fold. First, the port 22 allows the escape of entrapped air, which contributes to the interface resistance between the graphite sheets 14 and the copper current collector 12. Secondly, by the following the reaction, $Cu(II)O(s)+2H^++(SO_4)^- \rightarrow Cu(SO_4)+H_2O$ the intruding acid removes reverses copper oxidation that leads to the deposit of insulating copper oxide on the surface of the copper collector 12. Finally, the presence of the acid itself enhances conductivity between the graphite sheet 14 and the copper current collector 12.

Figure 3:
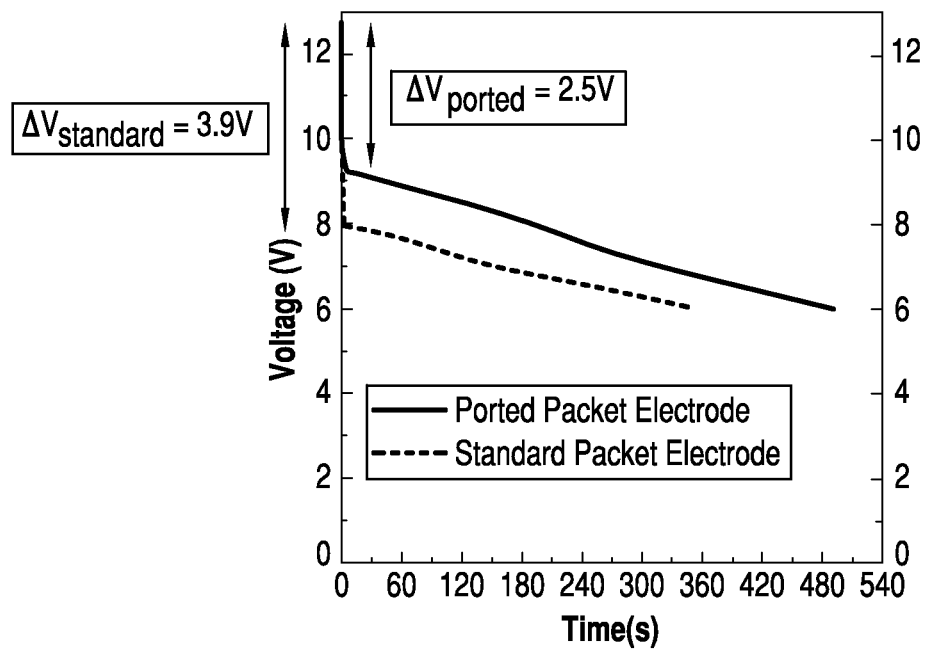
FIG. 3 is a graph illustrating High current (200 A) discharge curves (constant current) for ported packet lead-activated carbon batteries (solid) and standard packet batteries (dotted).

FIG. 3 graphically illustrates improved performance during a 200 A discharge of standard size BCI Group 30H 12V PbC® batteries available from Axion Power International, Inc. that were constructed with the modified electrode packet current collector assemblies of the present invention. The ported packet PbC® batteries exhibit a 70% improvement in internal resistance (e.g. on-charge voltage drop at ~1 sec after load application) over standard packet PbC® batteries. The resulting performance of the ported packet structure of the invention provides roughly 50% more energy during high power (4 C or 200 A) discharges (as calculated from the area under each curve).

Figure 4:
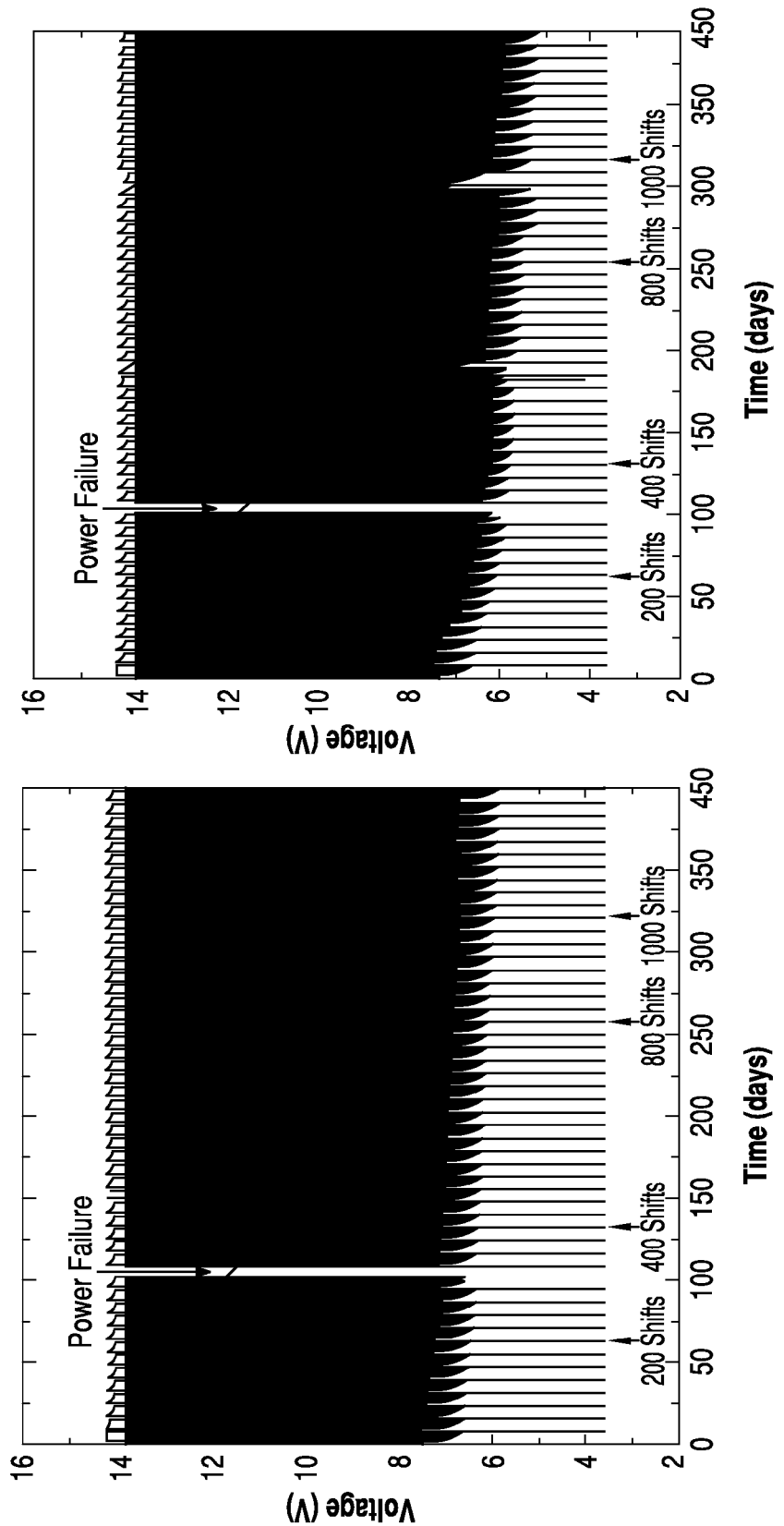
FIG. 4 is a comparative graph illustrating industrial cycling test data of a ported packet battery on the left and a standard packet battery on the right.

FIG. 4 illustrates a representation of two distinct sets of measurements resulting from a test for industrial test cycling: An industrial battery cycle was developed testing batteries that uses a significant portion of the batteries voltage range. A single ported battery and a standard battery design began cycling at the same time. Both batteries completed in excess of 1200 industrial cycles. The ported packet battery outperformed the standard packet battery since the beginning of the test presumably due to the lower resistance of the ported packets. The ported packet battery only started dipping below the 6 VDC end of discharge voltage around 1000 cycles. The standard battery end of discharge voltage is below 6 VDC since 200 shifts. This result provides additional support that the ported packet has a lower overall resistance when compared to a standard packet construction.

Figure 5:
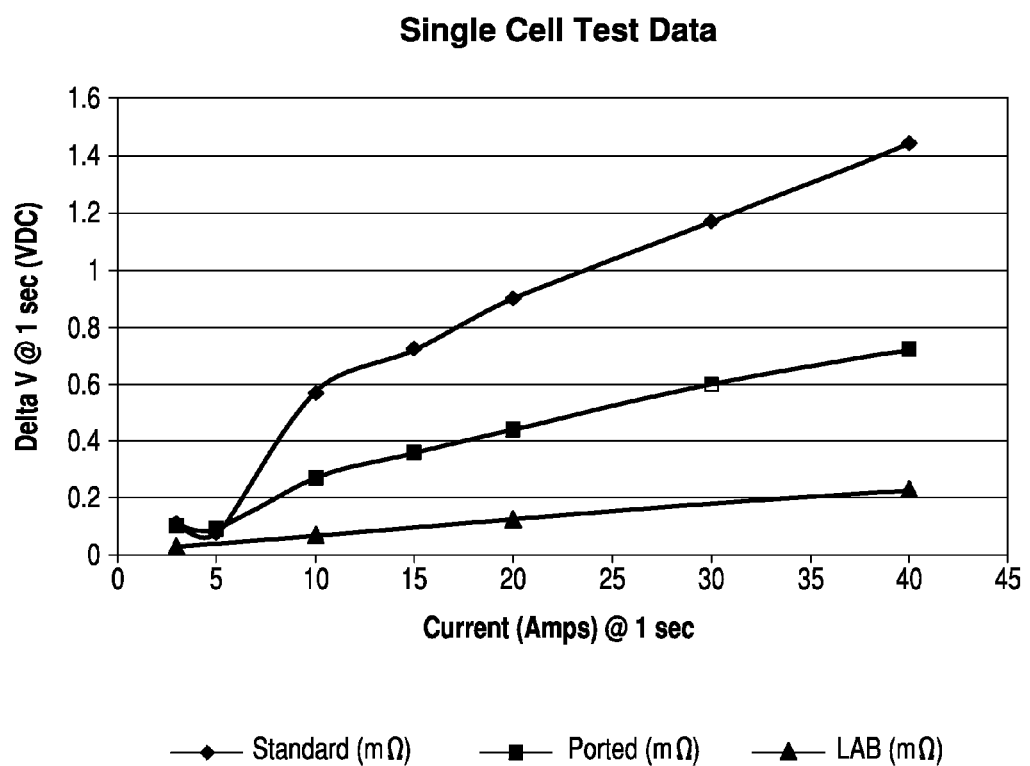
FIG. 5 is graphical illustration comparing performance of test cells constructed according to the invention with standard and ported packet cells as well as a lead acid cell for comparison.

FIG. 5 is a graphical representation of single cell testing. In this test, a series of single cells were fabricated to compare the performance of various negative activated carbon electrode designs against a traditional lead acid cell of similar dimensions. For this test four sets of standard packet and ported packet acid cells comprising two positive plates and one activated carbon negative electrode were used. The internal resistance of the designs were measured by the voltage drop method at 1.0 after 1 second. The delta V is plotted against the applied test current. The performance improvement of the ported construct over the standard construct is apparent from the graph.

As a final demonstration of the improved performance provided by the invention, the AC impedance of each battery produced from actual battery production runs was measured. In this case, two sets of 30H PbC® activated carbon lead batteries, one set containing standard packets and a second set contained ported packets. The resulting data is summarized in Table 1:

TABLE 1

| Statistics | Standard Packet Batteries | Ported Packet Batteries |
|---|---|---|
| Sample Size | 653 | 63 |
| Average | 19.21 | 5.80 |
| Standard Deviation | 6.71 | 0.71 |
| Minimum | 4.7 | 5.00 |
| Maximum | 50.8 | 9.74 |
| Range | 46.1 | 4.74 |

Although the present invention has been described in terms of a particular example embodiment, it is not limited to that embodiment. For example, although the embodiment is described in the context of a single notch and port spaced relative to the notch perimeter to minimize edge effect corrosion of the collector plate, without departing from the spirit and scope of the invention, the bottom edge (that opposite the collector tab containing top edge), may include another if not a plurality of laterally-spaced notches and overlying cooperating ports (e.g., 3 or 4 smaller ports) to achieve advantageous results of the character described above. The embodiments, examples, and modifications which would still be encompassed by the invention may be made by those skilled in the art, particularly in light of the foregoing teachings. Moreover, although specific terms are employed herein, they are used only in generic and descriptive sense, and not for the purposes of limiting the description of the invention.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

We claim:

1. An activated carbon lead negative electrode comprising:
   a) a generally planar metal current collector with a first and a second surfaces a top edge and a bottom edge, a collector tab projecting from the top edge of the current collector and at least one notch of select dimensions formed along the bottom edge of said current collector;
   b) first and second layers of expanded graphite foil of select thickness respectively laminated over said first and second surfaces each of said layers incorporating a small port positionally corresponding to and overlying the at least one notch where said port extends through the graphite foil thickness to permit electrolyte infiltration;
   c) first and second activated carbon sheeting laminated over said first and second layers.

2. The activated carbon lead negative electrode of claim 1 where there is a single notch disposed at a location to achieve maximal separation from the collector tab.

3. The activated carbon lead negative electrode of claim 2 where the notch is generally triangular and defines a centroid.

4. The activated carbon lead negative electrode of claim 3 where the metal current collector is copper and the port is circular and has a diameter ranging from 0.1-5 mm, and is spaced from the copper edge to minimize edge effect corrosion.

5. The activated carbon lead negative electrode of claim 4 where the port has a diameter of approximately 3 mm and overlies the centroid.

6. The activated carbon lead negative electrode of claim 4 where there is a single notch disposed at a location to achieve maximal separation from the collector tab.

7. The activated carbon lead negative electrode of claim 2 where the notch is generally triangular and defines a centroid.

8. The activated carbon lead negative electrode of claim 7 where the port is circular and spaced from the bottom edge to minimize edge effect corrosion.

9. An improved battery/energy storage device, with a positive electrode, a negative electrode and sulfuric acid electrolyte where the negative electrode is a laminated activated carbon comprising:
   a) a generally planar copper metal current collector with a first and a second surfaces a top edge and a bottom edge, a collector tab projecting from the top edge of the current collector and a generally triangular notch disposed along the bottom edge of said current collector;
   b) first and second layers of paraffin impregnated expanded graphite foil shielding of select thickness respectively laminated over said first and second surfaces where each of said layers incorporates a small port positionally corresponding to and overlying the notch where said port extends through the graphite foil thickness to permit sulfuric acid electrolyte infiltration there through;
   c) first and second activated carbon sheeting laminated over said first and second layers.

10. The improved battery/energy storage device of claim 9 exhibiting a reduction in overall resistance by at least 70%.

11. The method of reducing the resistance of a laminated activated carbon lead negative electrode in an energy storage device with sulfuric acid electrolyte where the negative electrode has a first outer layer of activated carbon, a graphite foil shield, a copper current collector with a collector tab projecting from an edge thereof, a second graphite foil shield, and a second outer layer of activated carbon, comprising the steps of:
   a) removing a portion of the copper current collector along an edge opposite from the collector tab to form a notch therein; and
   b) forming a port hole in the first graphite foil shield to overlie said notch and allow infiltration of the sulfuric acid electrolyte.

12. The method of claim 11 further comprising the step of forming a port hole in the second graphite foil shield positionally corresponding to the port hole in the first graphite foil shield to overlie said notch and allow infiltration of the sulfuric acid electrolyte.

13. The method of claim 12 where the graphite foil shields are composed of paraffin impregnated expanded graphite, the port hole in the first graphite foil shield and the port hole in the second graphite foil shield are circular, and the notch is triangular further comprising the step of positioning the port holes over the centroid of the notch.

14. The method of claim 12 where the overall resistance of the electrode is lowered by at least 70%.

* * * * *